June 24, 1958     V. L. RUGEN     2,839,941
TRANSMISSION AND CONTROL THEREFOR
Filed Aug. 13, 1956     2 Sheets-Sheet 1
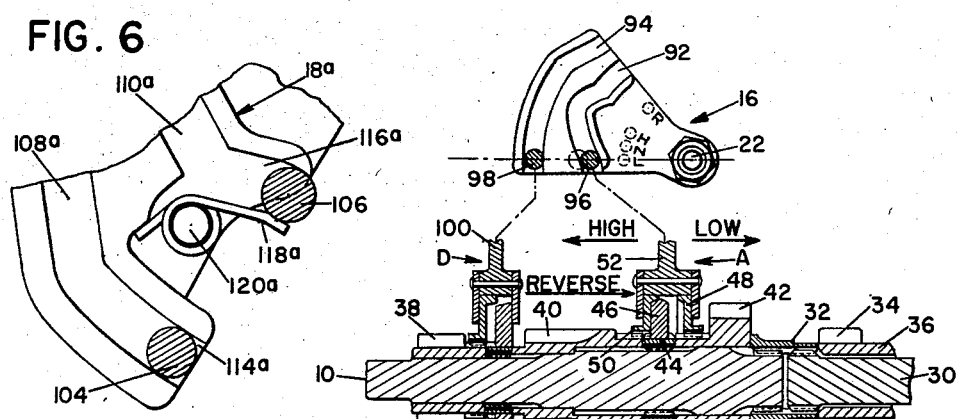
FIG. 6
FIG. 1
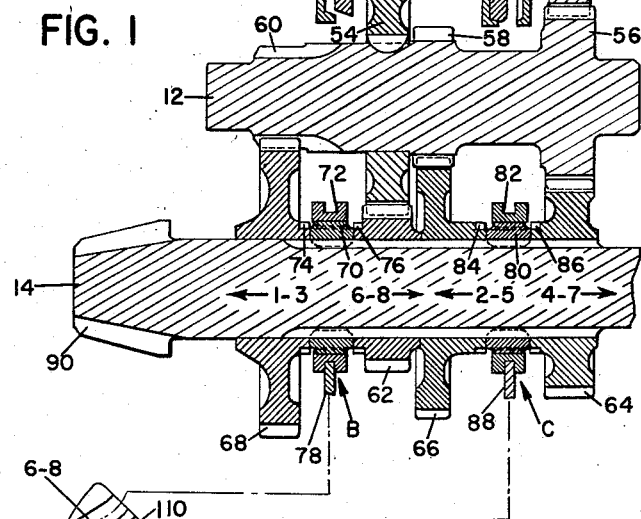
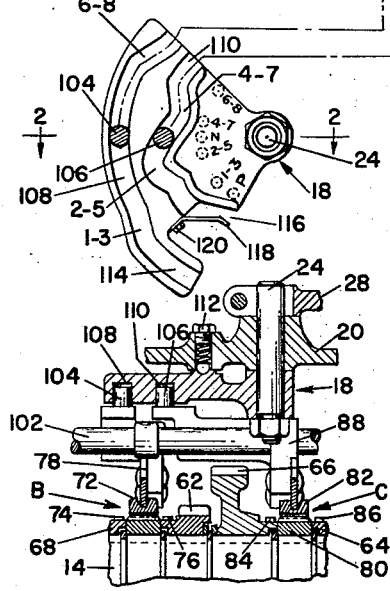
FIG. 2
INVENTOR.
V. L. RUGEN

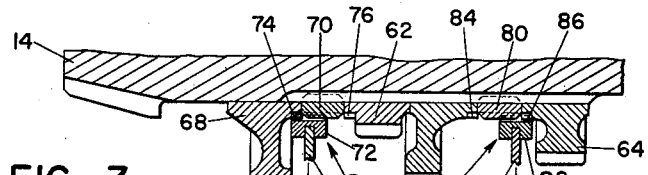
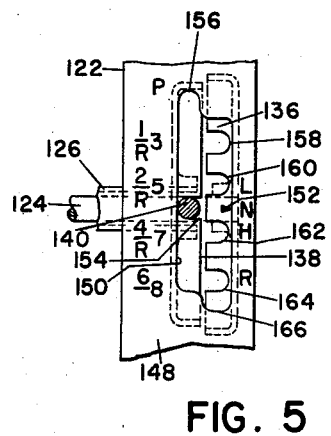

United States Patent Office 2,839,941
Patented June 24, 1958

2,839,941

TRANSMISSION AND CONTROL THEREFOR

Vernon L. Rugen, Cedar Falls, Iowa, assignor to Deere Manufacturing Co., Dubuque, Iowa, a corporation of Iowa Application August 13, 1956, Serial No. 603,538

10 Claims. (Cl. 74—359)

This invention relates to a transmission particularly adapted for vehicles. More particularly, the invention pertains to the accomplishment of a parking lock or brake by means of simultaneously engaging two clutches, gear sets or their equivalents at different speed ratios, thereby preventing the axle-connected transmission shaft from turning relative to another shaft in the transmission.

It is known, of course, particularly in the so-called automatic transmissions, to provide a parking position for a control lever, which position incurs the activation of a pawl or pin or similar lock on one of the rotating parts of the transmission. Hence, as long as the transmission is connected to the vehicle wheels, the vehicle is locked against accidental rolling or creeping. It very often occurs, however, that a pawl or pin of the character described is sheared off because of abuse. Moreover, the provision of such special parking lock is an additional expense. According to the present invention, these disadvantages are eliminated by the utilization of basic parts of the transmission; namely, a pair of gear sets or their equivalents of different speed ratios, the novel structure involving means for simultaneously engaging a pair of devices of different ratios so as to prevent relative rotation between a pair of shafts, one of which is connected to the vehicle wheels. It is a significant object of the invention to provide improved control means including a selector movable through a range including operation in which it will normally engage the devices independently of each other for conventional change-speed operation, but which range includes a further position in which both devices are simultaneously engaged. The invention has for another object the co-ordination of the control means in such manner that the engine-drive shaft is disconnected from the transmission when both of the devices are locked up, whereby the engine cannot drive the transmission in the condition just outlined. The invention features provision of means for biasing one or the other of the devices for engagement in the event that the angular position thereof relative to its cooperative member is not conducive to immediate engagement or mesh. It is a still further object of the invention to incorporate the novel structure in a transmission and control of existing types, particularly such as that shown in the U. S. Patent to DuShane and Rugen 2,710,546 and in copending application Ser. No. 526,971, filed August 8, 1955, now U. S. Patent 2,772,652.

The foregoing and other important objects and desirable features inherent in and encompassed by the invention will become apparent as preferred embodiments thereof are disclosed in detail in the ensuing specification and accompanying sheets of drawings, the several figures of which are described immediately below.

Fig. 1 is a comprehensive illustration of the transmission and control therefor, the transmission being shown in section and the controls being displaced from the main view to illustrate clearly their relation to the shiftable devices.

Fig. 2 is a fragmentary transverse section as would be seen along the line 2—2 of Fig. 1 were the parts arranged in their normal positions.

Fig. 3 is a fragmentary view, partly in section, of the lower portion of Fig. 1, showing the speed-change devices in different positions.

Fig. 4 is an external view, as seen from the opposite side of the vehicle, showing more of the control means.

Fig. 5 is a partial elevation as seen substantially along the line 5—5 of Fig. 4.

Fig. 6 is a fragmentary view of a modified form of part of the control means.

In the interests of orienting the views, it should be explained that Fig. 1 shows the horizontal input, counter and output shafts 10, 12 and 14, respectively, in horizontal positions, the front of the vehicle in which the transmission is used being assumed to be at the reader's right. The counter shaft 12 is illustrated somewhat out of its true position, which is not an obstacle to an understanding of the present invention, since details of the transmission are substantially identical to those in the above-identified DuShane and Rugen Patent 2,710,546. The illustration in Fig. 4 is reversed relative to that in Fig. 1, and the front of the vehicle will be at the reader's left. In Fig. 5, the front of the vehicle will be toward the top of the sheet.

The shiftable parts of the transmission are immediately under control of a pair of shifters 16 and 18, which will be hereinafter referred to respectively as the range cam and the speed cam. In Figs. 1 and 3, these are shown displaced from their true positions, but the operative relationship thereof to the transmission will be clear from Fig. 2. The transmission includes a casing or housing 20 which journals a transverse rockshaft 22 for the range cam and a rockshaft 24 for the speed cam. It may be assumed that the axis of the rockshaft 22 is normal to and intersects the axis of the input shaft 10 and that the axis of the rockshaft 24 is normal to and intersects the axis of the output shaft 14. The rockshafts 22 and 24 are selectively rockable by means of external arms 26 and 28 (Figs. 2 and 4), the control of which will be described below.

The input shaft 10 is driven in the first instance from an engine-drive shaft 30, and the two shafts are appropriately coaxially coupled at 32. A pinion 34 on a sleeve 36 surrounding the engine shaft 30 may be utilized to drive a power take-off, for example, which details are not material here.

The input shaft 10 journals thereon a reverse pinion 38, a low speed pinion 40 and a high speed pinion 42. The pinions 40 and 42 comprise part of what may be called range drive means, which means further includes a shiftable device or clutch A, here including a synchronizer such as that forming the subject matter of copending application Ser. No. 514,518, filed June 10, 1955.

For the present purposes, it will suffice to explain that the synchronizer has a hub 44 splined to the input shaft 30 between the pinions 40 and 42, and a synchronizer ring 46 is splined to the hub. High and low clutch rings 48 and 50, respectively, are splined respectively to the hubs of the pinions 42 and 40, and these two rings are shiftable simultaneously by means of a shifter fork 52 controlled by the range cam 16, as will be explained subsequently. Fig. 1 shows the clutch A in its low engaged position, in which the clutch ring 50 positively interconnects the synchronizer hub 44 and the pinion 40, whereby the input shaft 10 drives the low speed pinion 40. It will be understood that the clutch A has an intermediate or neutral position in which the clutch rings 48 and 50 are clear of the synchronizer hub 44. Moreover, a high-range position may be obtained by shifting of the fork 52 in the direction "high" for positively connecting the pinion 42 to the synchronizer ring 44 via the high speed ring 48.

The countershaft 12 has integral therewith or otherwise fixed thereto a plurality of countershaft gears comprising first, second, third and fourth gears 54, 56, 58 and 60. The gears 54 and 56 are respectively in constant mesh with the low and high speed pinions 40 and 42 on the input shaft 10. From the description thus far, it will be seen that the counter shaft is capable of being driven at either of two speeds or ranges, a low range when the pinion 40 is driven by the input shaft and a high range when the pinion 42 is driven by the input shaft. In addition to this, the output shaft 14 may be driven at any one of four speeds from the counter shaft and, in view of the dual-range characteristic of the range-drive means A, the output shaft therefore will have eight speeds forward. For this purpose, the output shaft 14 has journaled thereon first, second, third and fourth output shaft gears 62, 64, 66 and 68, which are respectively in constant mesh with the counter shaft gears 54, 56, 58 and 60. Whether or not the output shaft gears are connected to the output shaft depends upon the positions of shiftable devices or clutches B and C, both of which are shown in their neutral positions in Fig. 1. In explanation of the clutches B and C, they are shown here as of the dental type, but it should be understood that results comparable to those obtainable here are available by the shifting of simple gears or mechanisms equivalent to the clutches disclosed. Accordingly, the expression "clutch" is used in the interests of convenience only.

The clutch B comprises a hub 70 keyed to the output shaft and itself being externally splined to carry axially shiftably thereon a shiftable member of clutch ring 72 which is selectively shiftable to either side of its neutral position (Fig. 1) into either a cooperative dental hub 74 on the gear 68 or a cooperative dental hub 76 on the gear 62. The position of the clutch ring 72 is under control of a shifter fork 78.

The clutch C is of similar construction, having a hub 80 splined to the output shaft 14 and externally splined to axially shiftably carry a clutch ring 82 for selective engagement with a dental hub 84 on the gear 66 or a dental hub 86 on the gear 64. A shifter fork 88 controls the position of the clutch ring 82 for the clutch C.

The rear end of the output shift 14 has an integrally formed bevel pinion 90 for driving the rear axles, for example of a vehicle.

A plurality of speeds in reverse in the transmission may be obtained by a reverse clutch or synchronizer D, the details of which are not important, but the fundamentals of which involve shifting of the clutch D from the neutral position of Fig. 1 in the direction of the arrow marked "reverse" and thereby connecting the pinion 38 to the input shaft 10. As previously explained, the position of the countershaft 12 is displaced in the interests of clarity but it will be understood that when the three shafts 10, 12 and 14 are properly arranged, the output shaft gear 68 is in constant mesh with the pinion 38, so that when the pinion 38 is positively connected to the input shaft 10, the countershaft 12 revolves in a reverse direction, thereby making available four speeds in reverse for the output shaft 14. As will be brought out below, the fourth speed in reverse is too high for practical purposes in the environment illustrated and therefore is not used. Hence, the transmission is actually an eleven speed transmission, having eight speeds forward and three in reverse.

The range drive control means, including the range cam 16 and clutches A and D, together with other control elements, are arranged so that the clutch A is disengaged or in neutral when the clutch D is engaged and vice versa. Likewise, the clutch A can occupy only one of its positions at a time (low or high). This result is brought about by selective rocking of the range cam 16 about the axis of its rockshaft 22, and for this purpose the range cam has a pair of tracks 92 and 94 therein which respectively receive followers 96 and 98 which are in turn connected to the shifter fork 52 for the clutch A and a shifter fork 100 for the clutch D. The nature of the mechanical connection between the followers and the clutches is disclosed in the above-noted patent and need not be elatorated here. As shown in Fig. 1, the range cam has a plurality of detent notches respectively identified by the letters R, H, N and L. The tracks 92 and 94 have the desired configuration so that only one of the clutches A or D is shifted at a time. As shown in Fig. 1, the track 92 has caused the follower 96 to move to the right of its neutral position, whereby to accomplish the lower-range position of the clutch A. It will be seen that if the cam 16 is rocked downwardly or counterclockwise to the N position, the configuration of the track 92 will cause the follower 96 to move back to its dotted line position, thus achieving the neutral position of the clutch A. During this phase of rocking, the follower 98 will not be disturbed, because the portion of the track 94 in the angular range just referred to is concentric about the axis of the rockshaft 22. As counterclockwise rocking of the range cam 16 continues beyond the N position to the H position, the neutral position of the clutch D is still retained but the clutch A is shifted to the left, because the lower portion of the track 92 is eccentrically disposed to the left relative to the rockshaft axis. As counterclockwise movement of the range cam is continued in the angular range between H and R, the configuration of the track 92 is such as to return the clutch A to its neutral position, and thereafter the follower 96 travels in the upper concentric portion of the track, whereas the follower 98 for the reverse clutch D follows the upper offset portion of the track 92, whereby the neutral status of clutch A is retained and clutch D is shifted to its reverse position. The tracks 92 and 94, like those to be described in the speed cam 18, may be said to have zig-zag shapes.

Substantially similar principles are utilized in shifting of the clutches B and C on the output shaft 14 by means of the speed cam 18. The shifter forks 78 and 88 respectively for the clutches B and C are individually slidably carried on a fore-and-aft shift rod 102 and respectively have track followers 104 and 106 that respectively follow tracks 108 and 110 in the speed cam 18. The configuration of the tracks is such as to obtain the desired individual shifting of the clutches B and C during a normal speed-selection range of the speed cam.

For example, both clutches B and C are neutrally positioned in Fig. 1, and the speed cam 18 occupies its neutral position. If it be assumed that the speed cam is rocked in a counterclockwise direction about the axis of its rockshaft 24, then it will be observed that the follower 104 will not move, because the portion of the track in which it is presently situated is concentric about the axis of the rockshaft. However, the portion of the track in which the follower 106 is presently tracking is offset or nonconcentric. Hence, when the speed cam is moved to a position in which the 4—7 detent notch lies on a horizontal radius from the rockshaft axis (for example, the line 2—2 of Fig. 1) the follower 106 will have moved to the right and into the 4—7 portion of the track 110. With respect to the detent notches, a representative detent is shown at 112 for yieldably retaining the several angular positions of the speed cam.

Now, if continued movement of the speed cam is achieved in a counterclockwise direction the 6—8 detent notch will occupy the horizontal position and in this phase, the concentric portion of the track 108 will give way to the offset 6—8 portion, whereupon the follower 104 will move to the right. At the same time, the 4—7 portion of the other track 110 leads into a concentric upper portion which takes the clutch C out of its 4—7 position and returns it to neutral, in which position it is retained while the follower 104 on the clutch B occupies its 6—8 position.

The sam results are obtainable during clockwise rocking of the speed cam 18 from the position shown in Fig. 1. For example, the first phase of upward or clockwise rocking will cause the cam to assume the position in which the 2—5 detent notch is horizontal. The follower 104 is still running in the concentric portion of the track 108, and the follower 106 is thus caused to move to the left because of the offset or divergence of the 2—5 portion of the track 110. As the cam is moved clockwise to the position in which the 1—3 detent notch is horizontal, the follower 106 leaves the 2—5 portion and returns to the lower neutral portion of the track 110, simultaneously with departure of the follower 104 from the concentric portion of the track 108 to the divergent or offset 1—3 portion of the track 108.

To the extent described, the mechanism is substantially identical to that shown in the above-referred to patent and the arrangement is generally such that one or the other of the clutches B or C is first engaged to establish a speed ratio between the counter shaft 12 and the output shaft 14, after which the clutch A is moved from its neutral position to either its high or low position to establish a range ratio between the input shaft 10 and counter shaft 12, whereby the speeds available at the output shaft are doubled. For example, with the clutch B shifted to the left to engage the clutch ring 72 with the cooperative dental clutch or toothed member 74 on the gear 68, the gear 68 will then be positively connected to the output shaft 14 and with the clutch A in its low position as shown in Fig. 1, the input shaft 10 drives the counter shaft 12 via the engagement between the input shaft pinion 40 and the counter shaft gear 54 and the output shaft will rotate at a speed determined by the ratio between the pinion 40 and gear 54 and the further ratio between the counter shaft gear 60 and the output shaft gear 68. Shifting of the clutch B to the left will be achieved by clockwise rocking of the speed cam 18 to the 1—3 position in which the follower 104 will move to the left of the position shown in Fig. 1. Since the range clutch A is in its low speed position, the actual number of the ouput speed will be first or low. If, while the clutch B is engaged, the clutch A is shifted to its high position, the range ratio between the input shaft and the counter shaft will be changed according to the ratio between the input shaft pinion 42 and the counter shaft gear 56, which ratio is higher than that between the input shaft pinion 40 and the counter shaft gear 54, whereby the actual number of the output shaft speed will be third. Similarly, a selection between second and fifth, fourth and seventh or sixth and eighth is obtainable according to the positions of the clutches A, B and C.

The feature of the present invention is the achievement of a parking brake or lock by simultaneous engagement of the clutches B and C. This result is obtainable because of the different speed ratios between the countershaft 12 and output shaft 14, depending upon the ratios between the constantly meshing pairs of gears 60—68, 54—62, 58—66 and 56—64. For present purposes, the arrangement is such as to effect the simultaneous shifting of clutches B and C respectively to the left and to the right, so that the clutch B occupies the 1—3 position and the clutch C occupies the 4—7 position (Fig. 3). Consequently, the output shaft is locked to the countershaft 12, since the conflict between the speed ratios prevents relative rotation of the shafts. This result is obtainable independently of engagement or disengagement of clutches A and D. Preferably, the control means, as will be elaborated below, prevents engagement of clutch A while clutches B and C are simultaneously engaged. Hence, the countershaft can obtain no power from the engine shaft 30 in this condition, yet the engine may be continued in operation, as for driving the power take-off shaft (not shown) on stationary jobs, such as belt work in the case of an agricultural tractor.

Simultaneous shifting of the Clutches B and C respectively to their 1—3 and 4—7 positions is under control of the speed cam 18, which is modified over the above-noted copending application structure (Ser. No. 526,971) by a pair of track extensions 114 and 116 respectively on the main tracks 108 and 110. The track extension 114 comprises a concentric extension of the 1—3 portion of the track 108; that is, the extension 114 is concentric about the axis of the rockshaft 24. Thus, after the 1—3 position is obtained and the speed cam is rocked further in its clockwise direction, the 1—3 position of the clutch B (engagement of that clutch) will be retained. The track extension 116 is divergent from or offset relative to the neutral portion of the track 110 just below the 2—5 position. Stated otherwise, the offset of the track extension 116 is equivalent to the offset achieved at the 4—7 position. Hence, when the speed cam 18 is moved to its parking position as shown in Fig. 3, the follower 104 has been shifted to the left of its neutral position (indicated in broken lines) and the follower 106 has been shifted to the right of its neutral position (also shown in broken lines). Therefore, clutch B has been shifted to the left or to its 1—3 position and clutch C has been shifted to the right or to its 4—7 position. Stated otherwise, normal speed selection operation of the speed cam includes an angular range selectively obtaining the four speed change positions including 1—3, 2—5, 4—7, and 6—8. In addition, the track extensions, plus provision for further rocking of the rockshaft 24, produce for the speed cam a parking position beyond or additional to the range just described.

The type of track extension 116 shown in Figs. 1 and 3 includes yielding means in the form of a flat leaf spring 118 rigidly secured by a cap screw 120 to the speed cam. The purpose of this spring is to enable yielding of the spring in the event that the follower 106 cannot move immediately to the right because of angular misalignment of the dental components or cooperative teeth on the gear 64 and clutch ring 82. Hence, the speed cam can move to its parking position and the spring 118 will serve to load the follower so that when the angular misalignment disappears, the spring will force the clutch ring 82 to the right and into engagement with the teeth 86 on the hub of the gear 64.

A modification of this part of the structure appears in Fig. 6, wherein a speed cam 18a is shown as having a pair of tracks 108a and 110a, plus track extensions 114a and 116a. The follower 106 is shown in the track extension 116a, which differs from the track extension 116 in the type of spring or yielding means, that shown in Fig. 6 comprising a torsion spring 118a pivoted to the speed cam 18a at 120a and having one of its legs serving the same purpose as the flat spring 118. Other than that, the two structures are identical in function.

The manner of controlling the range and speed cams 16 and 18, and particularly with respect to securing the parking position of the speed cam, involves, in the particular disclosure, a modification of the control of the above-identified copending application Ser. No. 526,971, together with a selection of the positions of the clutches B and C according to such requirements as available space etc., it being understood that simultaneous engagement of the clutches B and C, or their equivalents, in other speed ratios could be utilized. That selected on the basis of the disclosure here accomplishes the result in a desirable manner but that achievement does not exclude benefits obtainable on the basis of exploitation of the principles outlined.

The control for the transmission includes, in addition to components already described, a control panel or support 122 in which a pair of independently journaled transverse rockshafts 124 and 126 are mounted. The rockshaft 126 is tubular and receives the rockshaft 124. The rockshaft 124 has keyed to its left hand or outer end an operating arm 128 which is connected by a link 130 to the arm 26 on the range cam rockshaft 22. The tubular rockshaft 126 has a rigid arm 132 at its left hand end which is connected by a link 134 to the speed cam rockshaft arm 28. Within the panel 122, the rockshafts 124 and 126 are respectively keyed to range and speed selectors 136 and 138, which are positioned in side-by-side relation and radiate from the rockshafts in such positions as to be independently movable back and forth relative to each other. A shift lever 140 is positioned between the two selectors 136 and 138 and has a lower forked end 142 carried by a block 144 that is loose on the rockshaft 126. The fork 142 is loosely pinned to the block 144 by a pin 146 on an axis transverse to the axis of the rockshaft arrangement, whereby the shift lever 140 is movable not only fore-and-aft but also laterally. As best shown in Fig. 5, the support or panel 122 has an upper portion 148 in which is formed an aperture 150 which defines the somewhat rectilinear path available to the shift lever 140. This aperture is marked along its left hand edge with appropriate legends, as indicated, designating the speed changes obtainable by movement of the speed selector 138, plus a park position (P) for said selector. The right hand edge of the aperture carries appropriate initials L, N, H and R, designating respectively the low, neutral, high and reverse positions of the range selector 136.

The range selector has thereon a single identifying mark, such as an arrow head 152 which, when aligned with one or the others of the letters L, N, H or R, indicates the position of the range selector. The speed selector 138 has therein a single notch 154 which receives the shift lever 140, whereby the lever may be utilized to rock the speed selector through its range including the speed change positions (1–3–R, 2–5–R, 4–7–R and 6–8), plus movement beyond that range to the park position P, at which point the left hand portion of the aperture 150 is elongated at 156 to accommodate this additional movement. The range selector 136 has four notches therein at 158, 160, 162 and 164. When both selectors are in neutral, as shown in Fig. 5, the notches 158, 160, 162 and 164 are respectively opposite the identifying legends 1–3–R, 2–5–R, 4–7–R and 6–8 at the left hand side of the panel aperture 150. The shift lever 140 in its single notch 154 in the speed selector is intermediate the notches 160 and 162 and therefore cannot be moved laterally into engagement with any of the notches in the range selector until the speed selector is first moved to one of its speed change positions. Hence, the speed must first be selected before the range is selected. For example, if the shift lever 140 is moved forwardly until it is laterally aligned with the 2–5–R mark, the clutch C will have been shifted via the speed cam 18 to the left so that the output shaft 14 is connected to the output gear 66. Now, whether the output shaft will be driven at second speed, fifth speed or reverse will depend upon the subsequent movement of the range selector 136. Since the shift lever 140, when moved to the position just outlined, is opposite the notch 160 in the range selector, the shift lever may be moved laterally into this notch, whereby it clears the speed selector and thereby is operative to move the range selector exclusively of the speed selector. If the shift lever is now moved forwardly to move the range selector also forwardly, the arrow 152 will become aligned with the letter L, which means that the range clutch A has been shifted forwardly to the Fig. 1 position to establish low range. Since the output shaft is already connected to the countershaft in the 2—5 ratio, the ultimate speed ratio will be second.

If the shift lever 140, still retained in the notch 160 of the range selector, is moved rearwardly and back to neutral, the shifter can be moved out of the range selector and back into the notch 154 of the speed selector and other speed ratios between the counter shaft and output shaft may be obtained. However, assuming that the shift lever 140 remains in the notch 160, the clutch C is still in its 2–5–R position. Thus, if the shift lever and range selector are moved simultaneously rearwardly so that the arrow 152 lines up with the letter H, clutch A will move from its neutral position, from which it has previously been returned, to its high position, thereby connecting the high range pinion 42 to the input shaft 10. Since the clutch C is already engaged in its 2–5 position, the ultimate speed ratio of the output shaft 14 will be fifth.

To obtain reverse, the clutch C still being engaged as already described, the shift lever 140, still in the notch 160 in the range selector, is moved rearwardly with the range selector until the arrow 152 lines up with the letter R. During this phase of movement, the clutch A will be restored to its neutral position and clutch D will be shifted to its engaged position, thus connecting the reverse pinion 38 positively to the input shaft for reversing the direction of rotation of the counter shaft, as generally described above.

The foregoing results may be obtained by first moving the speed selector, via the shift lever 140, to any one of the speed-change positions, and then moving the shift lever laterally across into the corresponding notch of the range selector. This pattern is available in all speeds except that fourth speed in reverse cannot be obtained in this particular structure, although it is available if desired. In the present case, the configuration of the aperture 150 is such, as at 166, that when the shift lever is moved to the 6—8 position and is then moved across into the notch 164, the portion 166 will prevent sufficient rearward movement of the range selector to line up the arrow 152 with the letter R. In other words, in this phase, the transmission will produce sixth and eighth speeds forward but will not produce fourth speed in reverse. It is obvious, of course, that elongation of the aperture at 166 will enable the transmission to produce the fourth reverse speed.

The configuration of the aperture is also such, by means of the elongation thereof at 156 at the part (P) position that the shift lever 140 may be used to move the speed selector beyond its speed-change range to the park position, whereby achieving simultaneous engagement of both clutches B and C (assuming, for the moment, that there will be no obstruction to engagement of the clutch C, as by failure of the cooperative toothed elements to mesh), which aspect of the operation, like normal speed-change movement of the speed selector, is achieved independently or exclusively of the range selector. However, as will be seen, when the shift lever 140 is in the park position, it is barred from moving to the right and therefore cannot engage the range selector. Hence, the range selector must retain its neutral position and the clutches A and D will both be disengaged or neutrally positioned. Hence, engine output cannot be transmitted to the transmission. At the same time, the lockup between the counter shaft and the output shaft establish the parking lock.

The foregoing characteristics of the invention, in its specific form, are applicable to the type of transmission previously referred to. It will be appreciated, of course, that exploitation of these principles in other transmissions is possible on the basis of the present disclosure. Likewise, advantages and features not categorically enumerated herein, together with modifications in the specific structure disclosed, will undoubtedly occur to those versed in the art, all of which may be achieved without departing from the spirit and scope of the invention.

What is claimed is:

1. A transmission and control therefor, comprising: a pair of shafts; first and second drive means for driving one shaft from the other respectively at two different speed ratios and respectively including first and second shiftable members, each having a neutral position and an engaged position; a shifter movable through a normal speed-change range and along a defined path and having first and second zig-zag tracks and first and second followers running respectively in said tracks and connected respectively to the first and second shiftable members; said first track having a neutral portion parallel to said path and retaining the neutral position of the first shiftable member and an adjoining active portion diverging from said path to incur the engaged position of said first shiftable member; said second track having a neutral portion parallel to said path and retaining the neutral position of the second shiftable member and an active portion diverging from said path to incur the engaged position of the second shiftable member; said active portion of each track being divergent in the zone of the neutral portion of the other track so that normally when one shiftable member is engaged the other must be in neutral; and said shifter being selectively movable beyond its normal range to a parking position and said shifter further having a first track extension running parallel to the path of shifter movement as a continuation of the first track active portion and a second track portion as an additional offset continuation of the second track neutral portion, whereby movement of the shifter to its parking position retains engagement of the first shiftable member via said first track extension and simultaneously conditions the second shiftable member for engagement via said second track extension.

2. A transmission and control therefor, comprising: a pair of shafts; first and second drive means for driving one shaft from the other respectively at two different speed ratios and respectively including first and second pairs of cooperative toothed members, one member of each pair being shiftable into and out of mesh with its companion member to achieve engaged and neutral positions respectively; a shifter movable through a normal speed-change range and along a defined path and having first and second zig-zag tracks and first and second followers running respectively in said tracks and connected respectively to the first and second shiftable members; said first track having a neutral portion parallel to said path and retaining the neutral position of the first shiftable member and an adjoining active portion diverging from said path to incur the engaged position of said first shiftable member; said second track having a neutral portion parallel to said path and retaining the neutral position of the second shiftable member and an active portion diverging from said path to incur the engaged position of the second shiftable member; said active portion of each track being divergent in the zone of the neutral portion of the other track so that normally when one shiftable member is engaged the other must be in neutral; and said shifter being selectively movable beyond its normal range to a parking position and said shifter further having a first track extension running parallel to the path of shifter movement as a continuation of the first track active portion and a second track portion as an additional offset continuation of the second track neutral portion, whereby movement of the shifter to its parking position retains engagement of the first shiftable member via said first track extension and simultaneously conditions the second shiftable member for engagement via said second track extension, said second track extension including yielding follower-engaging means biased to urge the second follower in the direction of engagement of the second shiftable member in the event that the relative angular positions of the members in the second pair prevents immediate mesh thereof.

3. The invention defined in claim 2, in which the second track includes a wall for guiding the second track follower and the yielding means comprises a spring element projecting from said wall as said second track extension.

4. The invention defined in claim 3, in which the spring is a flat leaf spring.

5. The invention defined in claim 3, in which the spring is a torsion spring having one leg projecting from said wall as said second track extension.

6. A transmission and control therefor, comprising: a pair of shafts; first and second drive means for driving one shaft from the other respectively at two different speed ratios and respectively including first and second shiftable members, each having a neutral position and an engaged position; a shifter movable through a normal speed-change range and operative to shift either member into its engaged position while retaining the neutral position of the other; and said shifter being movable to a parking position beyond said normal range and having means for simultaneously conditioning both shiftable members for engagement so as to interlock the two shafts against rotation because of the aforesaid difference in speed ratio.

7. A transmission and control therefor, comprising: a pair of shafts; first and second drive means for driving one shaft from the other respectively at two different speed ratios and respectively including first and second pairs of cooperative toothed members, one member of each pair being shiftable into and out of mesh with its companion member to achieve engaged and neutral positions respectively; a shifter movable through a normal speed-change range and operative to shift either member into its engaged position while retaining the neutral position of the other; and said shifter being movable to a parking position beyond said normal range and having means for simultaneously conditioning both shiftable members for engagement so as to interlock the two shafts against rotation because of the aforesaid difference in speed ratio, said last named means including a yielding element biasing the second shiftable member toward engagement and yielding in the opposite direction in the event that the relative angular positions of the members in the second pair prevents immediate mesh thereof.

8. A transmission and control therefor, comprising: a pair of shafts; first and second disengageable drive means for driving one shaft from the other respectively at two different speed ratios and respectively including first and second independently shiftable members, each having a disengaged neutral position and an engaged drive position; a shifter movable through a normal speed-change range and operative to shift either member into its engaged position while retaining the neutral position of the other; and means for selectively moving both shiftable members to their engaged positions so as to interlock the two shafts against rotation because of the aforesaid difference in speed ratio.

9. A transmission and control therefor, comprising: input, counter and output shafts; range drive means selectively engageable and disengageable between the input and counter shafts; a neutrally positioned range selector movable to a range position to engage said drive means; speed-change drive means between the counter and output shafts and including first and second separate clutches selectively engageable to drive the output shaft from the countershaft at either of two different speed ratios; a speed selector alongside the range selector and movable from a neutral position to any one of a first position incurring engagement of the first clutch and disengagement of the second clutch, a second position incurring engagement of the second clutch and disengagement of the first clutch, and a third position incurring engagement of both clutches so as to interlock the counter and output shafts because of the difference in speed ratios; a shift lever between the selectors and initially engaging the speed selector while the range selector is neutrally positioned to move said speed selector exclusively of the range selector to one of its three positions, said shift lever being arranged for movement laterally from the speed selector into engagement with the neutrally positioned range selector only when the speed selector occupies its first and second positions so that shift-lever movement of the range selector to its active position engages the range drive means only when one or the other of the speed-change clutches is engaged; and interlock means confining the shift lever against lateral movement into engagement with the range selector when said speed selector is in its third position whereby the range selector in its neutral position retains disengagement of the range drive means when both speed-change clutches are engaged.

10. A transmission and control therefor, comprising: input, counter and output shafts; range drive means selectively engageable and disengageable between the input and counter shafts; a neutrally positioned range selector movable to a range position to engage said drive means; speed-change drive means between the counter and output shafts and including first and second separate clutches selectively engageable to drive the output shaft from the countershaft at either of two different speed ratios; a speed selector movable from a neutral position to any one of a first position incurring engagement of the first clutch and disengagement of the second clutch, a second position incurring engagement of the second clutch and disengagement of the first clutch, and a third position incurring engagement of both clutches so as to interlock the counter and output shafts because of the difference in speed ratios; shift means for moving the selectors sequentially to initially select either the first or second position of the speed selector and then the active position of the range selector so as to first select a speed ratio between the counter and output shafts and to then engage the range drive means; and interlock means operative when the speed selector is moved to its third position to preclude said shift means from moving the neutrally positioned range selector whereby the range drive means remains disengaged when both speed-change clutches are engaged.

References Cited in the file of this patent

UNITED STATES PATENTS 1,923,995     Nock _____ Aug. 22, 1933